(12) United States Patent
Chen et al.

(10) Patent No.: US 6,291,554 B1
(45) Date of Patent: Sep. 18, 2001

(54) CURABLE SYSTEM OF SELF-EMULSIFIED AQUEOUS EPOXY RESIN AND ITS POLYMERIC HYBRIDS

(75) Inventors: Tsorng-Wen Chen, Kaohsiung; Jen-Taut Yeh, Taipei; Kan-Nan Chen, Taipei; Yun-Shan Lin, Taipei, all of (TW)

(73) Assignee: Chinese Petroleum Corp. (TW)

( * ) Notice: Subject to any disclaimer, the term of this patent is extended or adjusted under 35 U.S.C. 154(b) by 0 days.

(21) Appl. No.: 09/430,055

(22) Filed: Oct. 29, 1999

(30) Foreign Application Priority Data

Aug. 9, 1999 (TW) .................................................. 88113573

(51) Int. Cl.$^7$ ............................. C08K 3/20; C08L 63/02
(52) U.S. Cl. .......................... 523/404; 523/407; 523/408; 523/410; 524/501; 524/802
(58) Field of Search ................................... 523/404, 407, 523/408, 410; 524/501, 802

(56) References Cited

U.S. PATENT DOCUMENTS 3,862,914 * 1/1975 Anderson et al. .
4,179,440 * 12/1979 Martinez .
5,439,952 * 8/1995 Lum et al. ............................. 523/410

* cited by examiner

Primary Examiner—Robert Dawson
Assistant Examiner—D. Aylward
(74) Attorney, Agent, or Firm—Beyer, Weaver & Thomas, LLP

(57) ABSTRACT

Disclosed is an anionic, self-emulsified aqueous epoxy resin dispersion prepared through the semi-esterification reaction between a dicarboxylic acid anhydride and the secondary hydroxy group of an epoxy resin, followed by neutralization of the carboxylic acid thus introduced into the epoxy resin with a tertiary amine and then adding only water, without the need of any emulsifier, to the resulting hydrophilic amine salt of the carboxylic acid. The stable aqueous epoxy resin contains both carboxyl and epoxy groups which are reactive functional groups. Also disclosed is a "single-pack" curable aqueous epoxy resin system "cross-linkable" at normal temperature prepared by adding a compound containing polyaziridine as a cross-linking agent into the aqueous epoxy resin dispersion. Upon drying, the liberated carboxyl group in the aqueous epoxy resin reacts with the polyaziridine to form an amino ester via a ring opening reaction. The amino group further reacts with the epoxy group of the epoxy resin to run another cross linking reaction to complete a "double cross-linking". The novel double cross-linking process according to the present invention also can be used in a hybrid resin obtained by blending the aqueous epoxy resin dispersion and other carboxyl- or epoxy-containing aqueous resins, to cure the hybrid resin.

6 Claims, 3 Drawing Sheets

Figure 1. Preparation of self-emulsified aqueous epoxy resin
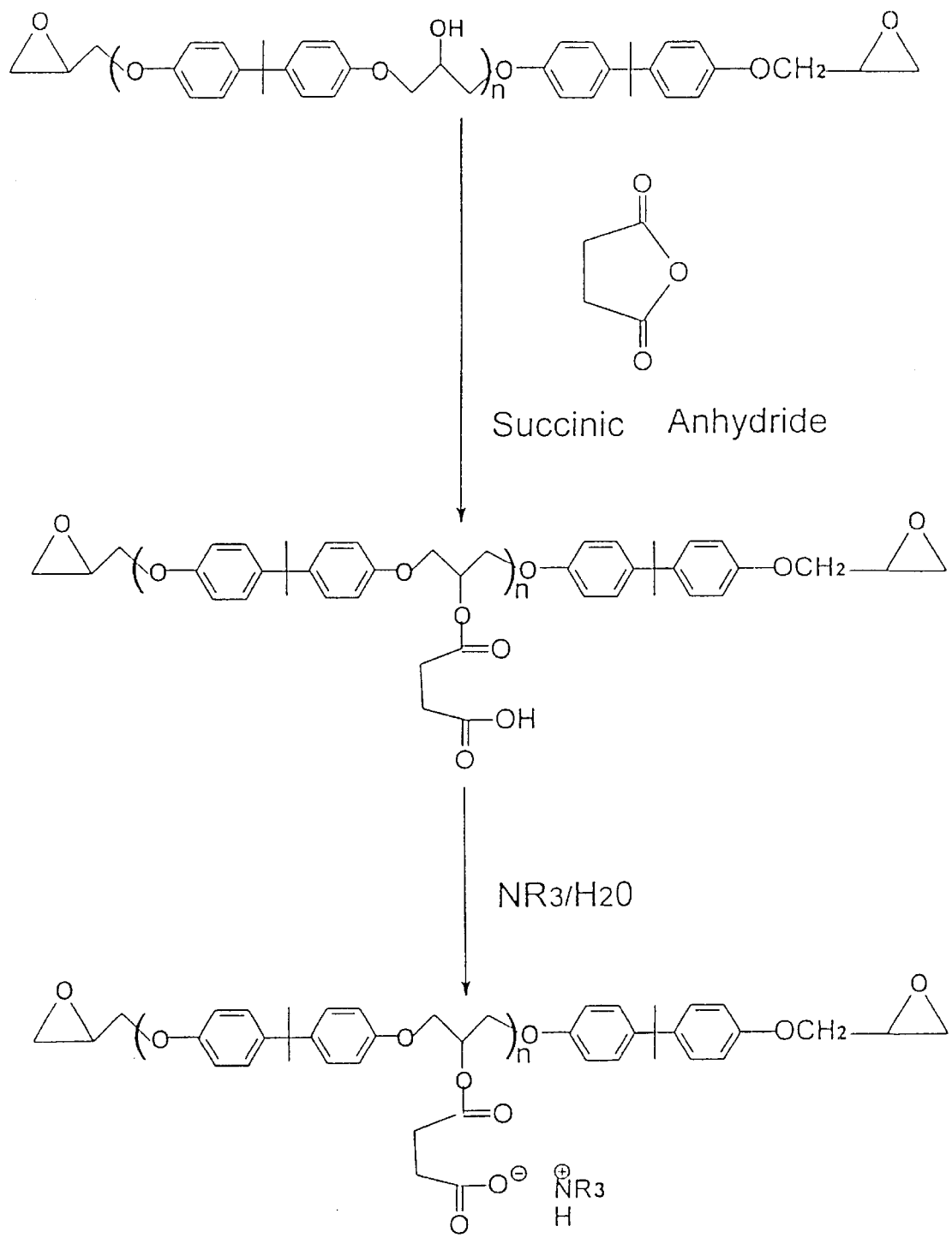
self-emulsified aqueous epoxy resin dispersion Figure 2. Double cross-linking reaction of self-emulsified aqueous epoxy resin
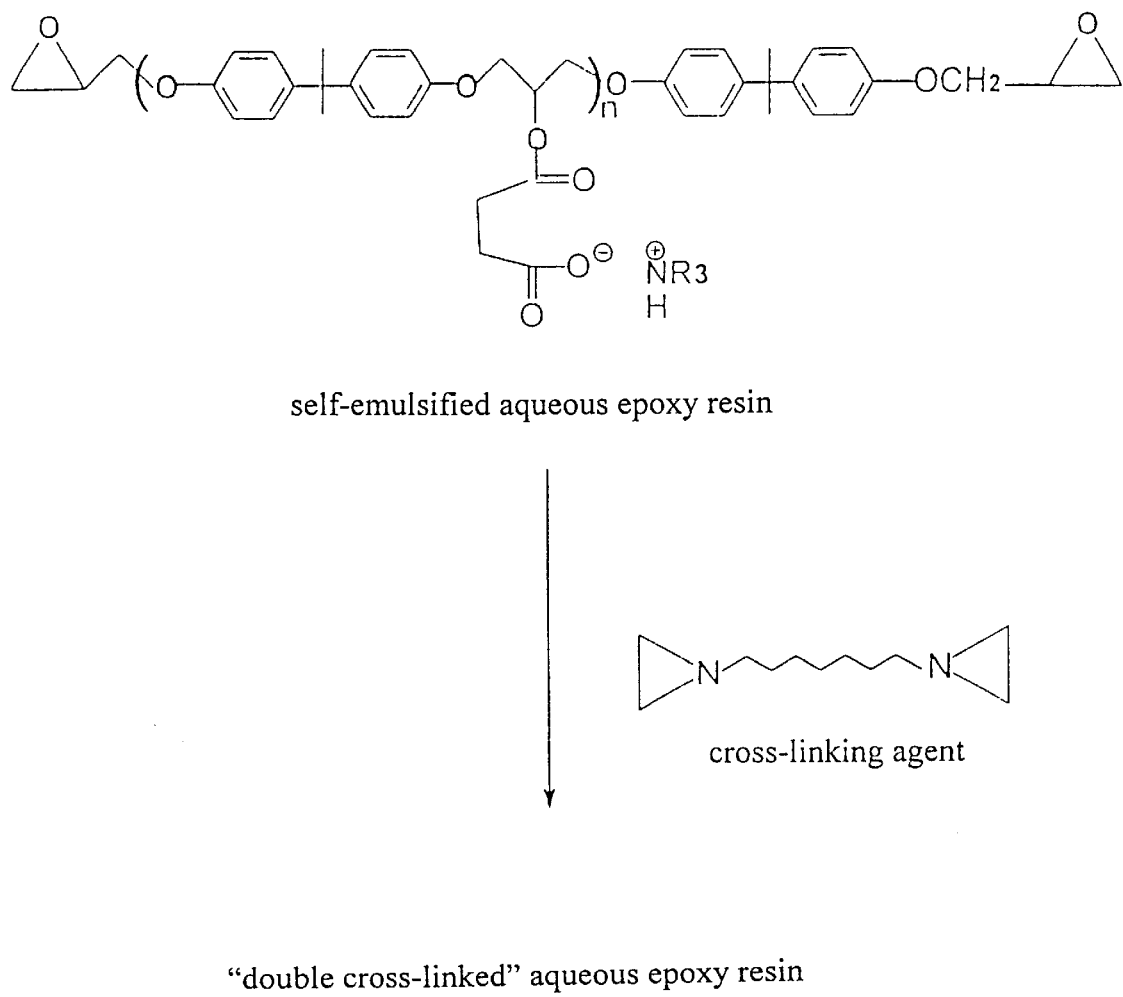
self-emulsified aqueous epoxy resin
cross-linking agent
"double cross-linked" aqueous epoxy resin

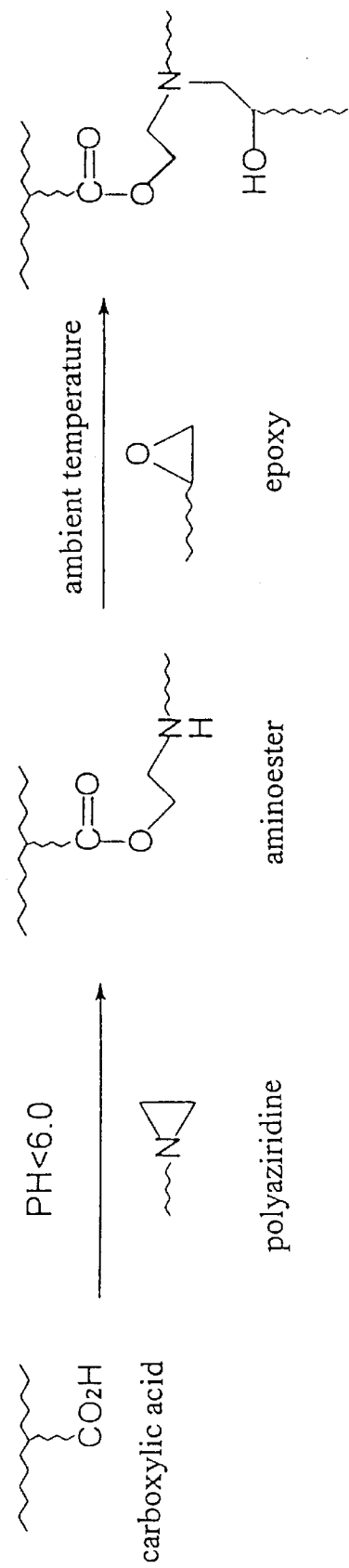
Figure 3. Cross-linking reaction of cross-linking agent

CURABLE SYSTEM OF SELF-EMULSIFIED AQUEOUS EPOXY RESIN AND ITS POLYMERIC HYBRIDS

BACKGROUND OF THE INVENTION

Epoxy resins have been widely used in the field of bonding, packaging, coating etc. Typically, epoxy resins are used in the type of "two-part", or called "A/B Part" type. Upon application, the main ingredient of the epoxy resin (Part A) and the curing agent (Part B) are admixed in a proper ratio in accordance with the epoxide equivalent weight (EEW) of the epoxy resin to the equivalent weight of the curing agent, and then cured. The application properties of the epoxy resins include curing rate which depends on the EEW thereof, the chemical structure and reactivity of the curing agents and the ratio between Parts A and B. Particularly, dosing the exact and accurate amounts of the epoxy resins and the curing agents is the most difficult step to control, especially, when the factors of equipment and manual-operation in the workplace are taken into account. These bothersome problems often arise when two-part type epoxy resins are used. Further, epoxy resins with high EEW (>250) are in solid form at ambient temperature and accordingly, need to be formulated into liquid solution with solvents such that the cross-linking agent can be admixed homogeneously. Thus the use of solvent cannot be eliminated under this circumstance. In particular, the emission of the solvents from epoxy resin coating composition result in not only the economic loss but also the damages to the environment protection, safety and hygiene.

At present, the aqueous epoxy resin emulsions are prepared by adding emulsifiers to conventional solvent-type epoxy resins and adding water to emulsify the resulting mixture. However, emulsification exerted by the emulsifiers added is limited by the critical micelle concentration of the aqueous epoxy resin emulsions and therefore, aggregation will occur in the emulsions under the situation where the emulsions are arbitrarily diluted with water or are blended with other aqueous resins. As a result of the foregoing, such aqueous epoxy resin emulsions obtained thorough emulsification with emulsifiers are not widely accepted in this field.

It is therefore a worldwide trend to replace the conventional solvent type resins with aqueous resins.

SUMMARY OF THE INVENTION

The present application provides an self-emulsified aqueous epoxy resin dispersion. The present dispersion is prepared by reacting a commercial epoxy resin with a dicarboxylic acid anhydride whereby the secondary hydroxy group of the epoxy resin are esterified with the dicarboxylic acid anhydride, while resulting in introducing a carboxyl group into the epoxy resin, adding a tertiary amine to the resultant carboxyl-containing epoxy resin in an amount at least stoichiometrically required to react with said carboxyl groups, such that the carboxyl groups in the epoxy resin are converted into the hydrophilic tertiary amine carboxylate groups, adding water to the reaction product, whereby self-emulsifying the epoxy resin. The present invention also provides a single-pack double curable aqueous resin system which comprises an aqueous resin containing an epoxy group and a tertiary amine carboxylate group, and as a cross-linking agent a polyaziridine in an aqueous medium. Upon application in coating, free carboxyl groups are liberated from the tertiary amine carboxylate groups of the aqueous epoxy resin through the action of carbon dioxide in the atmosphere and react with the reacting group, that is, ethylenimine groups of the polyaziridine, as a cross-linking agent, under common curing condition to form hydrophobic aminoester groups among the aqueous resin molecules. The amino groups in the resultant aminoester groups further react with the terminal epoxy groups of the epoxy resin to run second cross-linking reaction via ring-opining thereby completing a double curing in the aqueous epoxy resin. Furthermore, aqueous resins containing both carboxyl and epoxy groups or only carboxyl group such as aqueous acrylate resin and polyurethane (PU) resin can be cured by making use of this curing system. Also provided is a single-pack curable hybrid resin which is prepared by blending a mixture of the self-emulsified aqueous epoxy resin according to the present invention and the commercial aqueous resin mentioned above in various ratios with a polyaziridine as a cross-linking agent.

BRIEF DESCRIPTION OF THE DRAWINGS

FIG. 1 schematically illustrates the preparation of the self-emulsified aqueous epoxy resin according to the present invention.

FIG. 2 schematically illustrates the double cross-linking reaction of the self-emulsified aqueous epoxy resin according to the present invention.

FIG. 3 schematically illustrates the cross-linking reaction of the cross-linking agent of the present invention.

DETAILED DESCRIPTION OF THE INVENTION

Commercial epoxy resins with an EEW above about 250 and the recurring number of reactive monomers in the resin, $n \geq 2$ are normally solid at room temperature and have about more than two secondary hydroxyl groups per epoxy resin molecule in average. In the present invention, a dicarboxylic acid anhydride, for example, maleic, succinic, malonic, glutaric and adipic anhydrides, is contacted with an epoxy resin to run semi-esterification. The esterification of one equivalent of secondary hydroxyl group results in the generation of one equivalent of carboxylic acid group and the neutralization of the resultant carboxylic acid group with a tertiary amine followed by adding water to bring about leads to the production of self-emulsified aqueous epoxy resin dispersion (referring to FIG. 1). The aqueous epoxy resin contains hydrophilic carboxyl group, besides epoxy group, and the level of the carboxyl group determines the hydrophilicity of the aqueous epoxy resin. Typically, when n>2, the aqueous epoxy resin is soluble in water and thus the solid content of the aqueous epoxy resin dispersion can be increased to 75% (w/w).

The present application provides a self-emulsified aqueous epoxy resin dispersion. The present dispersion is prepared by reacting a commercial epoxy resin with a dicarboxylic acid anhydride whereby the secondary hydroxy group of the epoxy resin are esterified with the dicarboxylic acid anhydride, while resulting in introducing a carboxyl group into the epoxy resin, adding a tertiary amine to the resultant carboxyl-containing epoxy resin in an amount at least stoichiometrically required to react with said carboxyl groups, such that the carboxyl groups in the epoxy resin are converted into the hydrophilic tertiary amine carboxylate groups, adding water to the reaction product, thereby self-emulsifing the epoxy resin. The present invention also provides a single-pack double curable aqueous resin system which comprises an aqueous resin containing an epoxy group and a tertiary amine carboxylate group, and as a cross-linking agent a polyaziridine in an aqueous medium.

Upon application in coating, free carboxyl groups are liberated from the tertiary amine carboxylate groups of the aqueous epoxy resin through the action of carbon dioxide in the atmosphere and react with the reacting group, that is, ethylene imine groups of the polyaziridine, as a cross-linking agent, under common curing condition to form hydrophobic aminoester groups among the aqueous resin molecules. The amino groups in the resultant aminoester groups further react with the terminal epoxy groups of the epoxy resin to run second cross-linking reaction via ring-opining thereby completing a double curing in the aqueous epoxy resin. Furthermore, commercial aqueous resins containing both carboxyl and epoxy groups or only carboxyl group such as aqueous acrylate resin and polyurethane (PU) resin can be cured by making use of this curing system. Also provided is an one-part curable hybrid resin which is prepared by blending a mixture of the self-emulsified aqueous epoxy resin according to the present invention and the commercial aqueous resin mentioned above in various ratios with a polyaziridine as a cross-linking agent According to the present invention, the hydrophilicity of the aqueous epoxy resin as shown in FIG. 1 can be controlled by the degree of the semi-esterification of the epoxy resin with the anhydride. The stability of epoxy resin in water depends on the existence of the hydrophilic carboxylic group, which is the critical functional group in the self-emulsified aqueous epoxy resin dispersion.

Upon application in coating, free carboxyl groups are liberated from the tertiary amine carboxylate groups of the aqueous epoxy resin through the reaction of carbon dioxide in the atmosphere and then react with polyaziridine, as a cross-linking agent to run cross-linking reaction via ring opening. The reaction of the carboxyl group of the aqueous epoxy resin with polyaziridine, as a cross-linking agent, results in an aminoester (referring to FIGS. 2 and 3). The resulting secondary amine further reacts with the epoxy group of the aqueous epoxy resin according to the present invention to run epoxy cross-linking reaction via ring opening (referring to FIG. 3). In the double cross-linking reaction between polyaziridine, as a cross-linking agent, and the self-emulsified aqueous epoxy resin dispersion, the use of a single cross-linking agent not only leads to the formation of the hydrophobic aminoester from the reaction with the hydrophilic carboxyl of the aqueous epoxy resin according to the present invention but also makes possible the ring-opening reaction between the secondary amino group on the aminoester and the terminal epoxy group of the aqueous epoxy resin. In the double cross-linking of, in particular the present curable system through the use of a single cross-linking agent, as long as the curable system is controlled to have a pH higher than 8–9 through the addition of a tertiary amine such as triethylamine, a stable aqueous epoxy resin dispersion can be prepared from polyaziridine and the aqueous epoxy resin according to the present invention. By drying the aqueous epoxy resin dispersion at ambient temperature or by adjusting the pH of the dispersion to less than 6.0, polyaziridine starts to cross-link the carboxyl group of the aqueous epoxy resin to form aminoester, then the amino group of the aminoester reacts with terminal epoxy group of the epoxy resin to run second cross-linking reaction via epoxy ring-opening. Through the continuous and double cross-linking reaction, the cross-linked degree of the aqueous epoxy resin according to the present invention can be adjusted as desired. Hence, the present invention provides a novel and alternative choice for the manufacture and application of self-emulsified aqueous epoxy resin dispersions.

Analogously, double curable systems similar to the aqueous epoxy resin described above can be prepared from polyaziridine and hybrid resins consisting of the aqueous epoxy resin dispersion of the present invention and aqueous acrylate resin or polyurethane (PU) emulsion or dispersion or resins containing carboxyl, amino and epoxy groups or containing carboxyl and amino or epoxy groups. These aqueous hybrid resins are cured through the same cross-linking reaction with polyaziridine as the cross-linking agent.

Best Mode

The following Examples serve to illustrate the preferred embodiments of the present invention but the present invention is not introduced to be limited to the details thereof.

Example 1

Preparation of Self-emulsified Anionic Aqueous Epoxy Resin (I)

To a 250 mL round-bottomed flask was charged 25 g of an epoxy resin (EEW=738), 6.8 g of succinic anhydride, 120 ml of toluene and 0.5 g of T-12 (dibutyltin dioctanoate). The reaction mixture was heated on a heating mantle to reflux (about 120° C.) and then heated under reflux with stirring for 4 hours to obtain a semi-esterified product of the epoxy resin. After cooling, small amount of THF (tetrahydrofuran) was added and then water was added, followed by stirring for 20 minutes to remove the unreacted succinic anhydride in the aqueous layer. The resulting organic layer was evaporated in vacuo to remove the organic solvent. The residue thus obtained was dissolved in minor amount of acetone and neutralized with triethylamine. The resulting solution was added slowly and dropwise into 30 ml of distilled water in a beaker with stirring. A semitranslucent aqueous epoxy resin dispersion with a solid content of about 50% was obtained.

Example 2

Preparation of Self-emulsified Anionic Aqueous Epoxy Resin (II)

Another self-emulsified anionic aqueous epoxy resin dispersion was prepared in accordance with Example 1, except that maleic anhydride was used instead of succinic anhydride.

Example 3

Curing Reaction Between Self-emulsified Aqueous Epoxy Resin and Polyaziridine as the Cross-linking Agent 100 g of self-emulsified aqueous epoxy resin dispersion and 5 phr polyaziridine (UX-900 sold by Chi-Li Chemical Co. or CX-100 sold by ICI), as a cross-linking agent, were homogeneously admixed. After drying at ambient temperature, a cured aqueous epoxy resin was obtained, which was almost insoluble in water (the starting aqueous epoxy resin was soluble in water). The gel content increased from 0% to above 90%.

Example 4

Blending of Self-emulsified Aqueous Epoxy Resin and Anionic Aqueous PU Resin

A self-emulsified aqueous epoxy resin of the present invention and an anionic aqueous PU resin (aqueous PU resin containing amino and carboxyl groups) were blended in an equal weight percentage. After drying at ambient temperature, an epoxy/PU hybrid resin was obtained, which had a gel content of above 72% (the gel contents of the starting aqueous PU and epoxy resin were 0%, respectively).

Example 5

Curing Reaction of Epoxy/PU Aqueous Hybrid Resin 100 g of the epoxy/PU aqueous hybrid resin (weight ratio 1/1) prepared according to Example 4 and 5 phr UX-900 were homogeneously admixed. After drying at ambient temperature, a film of epoxy/PU hybrid resin was obtained, which had a gel content of above 92%.

Example 6

Curing Reaction of Hybrid Resin of Self-emulsified Aqueous Epoxy Resin and Carboxyl-containing Acrylate Resin The self-emulsified aqueous epoxy resin dispersion of the present invention and a carboxyl-containing acrylate resin emulsion were blended in an equal weight percentage to prepare an aqueous epoxy/acrylate hybrid resin. To 100 g of the aqueous epoxy/acrylate hybrid resin was added 5 phr of UX-900. The epoxy/acrylate hybrid resin was dried and cross-linked to have a gel content of above 88%.

Example 7

Curable System of Hybrid Resin of Aqueous Epoxy Resin and Aqueous Acrylic Copolymer Emulsion Comprising Glycidyl Methacrylate (GMA)

100 g of aqueous epoxy resin according to the present invention (solid content 50%) and GMA/acrylic copolymer emulsion (solid content 40%) were homogenized in an aqueous phase, 8 phr polyazirdine cross-linking agent (UX-900) was then added and the resulting mixture was stirred for 0.5 hour. The resulting mixture was coated on a substrate and dried to form a film. The dried film had a gel content of above 90% (non-cross-linked GMA/ acrylic copolymer had a gel content of 0%).

What is claimed is:

1. A single-pack double curable aqueous resin system, comprising an aqueous resin containing epoxy and carboxyl groups and a polyaziridine cross-linking agent.

2. The curable system according to claim 1 wherein the aqueous resin is a self-emulsified aqueous epoxy resin dispersion obtained through a semi-esterification reaction between a dicarboxylic acid anhydride and the hydroxy group of an epoxy resin, followed by neutralizing carboxyl groups thus introduced into the epoxy resin with a tertiary amine in an aqueous medium.

3. The curable system according to claim 1 wherein the aqueous resin is an epoxy-containing acrylate homopolymer and/or copolymer.

4. A single-pack curable system of hybrid resin, comprising a hybrid resin and a polyaziridine cross-linking agent, wherein the hybrid resin consists of a self-emulsified aqueous epoxy resin dispersion obtained through a semi-esterification reaction between a dicarboxylic acid anhydride and the hydroxy group of an epoxy resin, followed by neutralizing carboxyl groups thus introduced into the epoxy resin with a tertiary amine in an aqueous medium, and one or more aqueous resin(s) selected from carboxyl-containing acrylate emulsion, aqueous polyurethane dispersion and epoxy-containing acrylate homopolymer and/or copolymer.

5. The curable system according to claim 2 wherein the dicarboxylic acid anhydride comprises 3 to 8 carbon atoms.

6. The curable system according to claim 5 wherein the dicarboxylic acid anhydride is succinic anhydride or maleic anhydride.

* * * * *